United States Patent
Hui

(10) Patent No.: US 11,903,041 B2
(45) Date of Patent: Feb. 13, 2024

(54) ABNORMALITY PROCESSING METHOD, TERMINAL DEVICE AND STORAGE MEDIUM

(71) Applicants: SHENZHEN HEYTAP TECHNOLOGY CORP., LTD., Guangdong (CN); GUANGDONG OPPO MOBILE TELECOMMUNICATIONS CORP., LTD., Guangdong (CN)

(72) Inventor: Tao Hui, Guangdong (CN)

(73) Assignees: SHENZHEN HEYTAP TECHNOLOGY CORP., LTD., Shenzhen (CN); GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 485 days.

(21) Appl. No.: 17/323,714

(22) Filed: May 18, 2021

(65) Prior Publication Data

US 2021/0274573 A1 Sep. 2, 2021

Related U.S. Application Data

(63) Continuation of application No. PCT/CN2018/116198, filed on Nov. 19, 2018.

(51) Int. Cl.
*H04W 76/10* (2018.01)
*H04W 48/16* (2009.01)
(Continued)

(52) U.S. Cl.
CPC ........... *H04W 76/10* (2018.02); *H04W 48/16* (2013.01); *H04W 48/18* (2013.01); *H04W 92/10* (2013.01)

(58) Field of Classification Search
CPC ... G06F 9/445; G06F 9/54; G06F 9/48; G06F 9/00; G06F 13/24; G06F 8/41;
(Continued)

(56) References Cited

U.S. PATENT DOCUMENTS 8,196,153 B1 * 6/2012 Cesare .................. G06F 9/4411
719/321
2006/0242402 A1 10/2006 Swift et al.

FOREIGN PATENT DOCUMENTS

CN 102662786 A 9/2012
CN 104166609 A 11/2014
(Continued)

OTHER PUBLICATIONS

Japanese Notice of Reasons for Refusal with English Translation for JP Application 2021528853 dated Jun. 21, 2022. (7 pages).
(Continued)

Primary Examiner — Tu X Nguyen
(74) Attorney, Agent, or Firm — Young Basile Hanlon & MacFarlane, P.C.

(57) ABSTRACT

A method for processing an abnormality is provided. The method includes: loading and executing a driver of the Wi-Fi module in response to receiving an instruction for enabling a Wi-Fi function of the terminal device, initiating at least one request sub-process to a hardware layer of a Wi-Fi system of the terminal device through a framework layer of the Wi-Fi system, clearing the driver of the Wi-Fi module from a memory of the terminal device in response to failure of any request sub-process and re-loading and executing the driver of the Wi-Fi module after completely clearing the driver of the Wi-Fi module from the memory.

20 Claims, 4 Drawing Sheets loading and executing a driver of the Wi-Fi module in response to receiving an instruction for enabling a Wi-Fi function of the terminal device — S101 initiating at least one request sub-process to a hardware layer of a Wi-Fi system of the terminal device through a framework layer of the Wi-Fi system — S102 clearing the driver of the Wi-Fi module from a memory of the terminal device in response to failure of any request sub-process — S103 re-loading and executing the driver of the Wi-Fi module after completely clearing the driver of the Wi-Fi module from the memory — S104

(51) Int. Cl.
*H04W 48/18* (2009.01)
*H04W 92/10* (2009.01)

(58) Field of Classification Search
CPC .... G06F 12/0871; G06F 16/25; H04W 76/10;
H04W 88/02; H04W 76/14; H04W 76/19
See application file for complete search history.

(56) References Cited

FOREIGN PATENT DOCUMENTS

| | | |
|---|---|---|
| CN | 105208061 A | 12/2015 |
| CN | 108021407 A | 5/2018 |
| EP | 2189906 A1 | 5/2010 |
| JP | 2005229605 A | 8/2005 |
| JP | 2006236236 A | 9/2006 |
| JP | 2006309404 A | 11/2006 |
| JP | 2009533890 A | 9/2009 |
| JP | 2011118873 A | 6/2011 |
| JP | 2012105038 A | 5/2012 |
| WO | 2005008498 A2 | 1/2005 |

OTHER PUBLICATIONS

Indian Examination Report for IN Application dated Mar. 14, 2022. (6 pages).
ISR with English Translation for PCT application PCTCN2018116198 dated Jul. 5, 2019.
Extended European Search Report for EP Application 18941018.6 dated Nov. 3, 2021. (12 pages).

\* cited by examiner

ABNORMALITY PROCESSING METHOD, TERMINAL DEVICE AND STORAGE MEDIUM

CROSS-REFERENCE TO RELATED APPLICATION(S)

This application is a continuation of International Application No. PCT/CN2018/116198, filed with the State Intellectual Property Office of P. R. China on Nov. 19, 2018, the entire disclosure of which is herein incorporated by reference.

TECHNICAL FIELD

The present disclosure relates to a field of communication technology, and more particularly to a method for processing an abnormality, a terminal device and a computer readable storage medium.

BACKGROUND

At present, most terminal devices, such as mobile phones, are provided with wireless network cards. The wireless network card is actually one of the three most important modules of Intel Centrino Mobile Technology, i.e., Wi-Fi module. The wireless network card is typically provided with a transmitting module and a receiving module. When a user accesses a wireless local network via the Wi-Fi module of the terminal device, it is needed to scan available wireless access points (APs) in the neighborhood, select one scanned AP as a configured AP, and connect to the configured AP to launch an internet business through the configured AP.

SUMMARY

The present disclosure provides a method for processing an abnormality when accessing a wireless local network via a Wi-Fi module, a terminal device, and a computer readable storage medium.

According to a first aspect of embodiments of the present disclosure, a method for processing an abnormality is provided. The method is applicable in a terminal device including a Wi-Fi module, and includes loading and executing a driver of the Wi-Fi module in response to receiving an instruction for enabling a Wi-Fi function of the terminal device, initiating at least one request sub-process to a hardware layer of a Wi-Fi system of the terminal device through a framework layer of the Wi-Fi system, clearing the driver of the Wi-Fi module from a memory of the terminal device in response to failure of any request sub-process, and re-loading and executing the driver after completely clearing the driver of the Wi-Fi module from the memory.

According to a second aspect of embodiments of the present disclosure, a terminal device is provided. The terminal device includes a loading and executing unit, a request sub-process initiating unit, a clearing unit and a re-loading and executing unit. The loading and executing unit is configured to load and execute a driver of the Wi-Fi module in response to receiving an instruction for enabling a Wi-Fi function of the terminal device. The request sub-process initiating unit is configured to initiate at least one request sub-process to a hardware layer of a Wi-Fi system of the terminal device through a framework layer of the Wi-Fi system. The clearing unit is configured to clear the driver of the Wi-Fi module from a memory of the terminal device in response to failure of any request sub-process. The re-loading and executing unit is configured to re-load and execute the driver after completely clearing the driver of the Wi-Fi module from the memory.

According to a third aspect of embodiments of the present disclosure, a terminal device is provided. The terminal device includes a memory, a processor and computer programs stored in the memory and executable on the processor. When the computer programs are executed by the processor, steps of the method provided in the first aspect of the embodiments of the present disclosure are implemented.

According to a fourth aspect of embodiments of the present disclosure, a computer-readable storage medium is provided. The computer-readable storage medium stores computer programs therein. When the computer programs are executed by one or more processors, steps of the method provided in the first aspect of the embodiments of the present disclosure are implemented.

According to a fifth aspect of embodiments of the present disclosure, a computer program product is provided. The computer program product includes computer programs. When the computer programs are executed by one or more processors, steps of the method provided in the first aspect of the embodiments of the present disclosure are implemented.

BRIEF DESCRIPTION OF DRAWINGS

To illustrate the solutions according to the embodiments of the present disclosure or in the prior art more clearly, accompanying drawings needed for describing the embodiments or the prior art are briefly introduced below. Obviously, the accompanying drawings in the following descriptions are merely some embodiments of the present disclosure, and persons of ordinary skill in the art may obtain other drawings according to the accompanying drawings without making creative efforts.

DETAILED DESCRIPTION

In the following, for purposes of illustration and not limitation, a plurality of particular details such as specific system structure, technology and so on are provided for a comprehensive understanding of the present disclosure. However, it would be understood by those skilled in the art that the subject matter proposed herein may be implemented without using these particular details. In other cases, well-known methods, programs, components and circuits are not described in detail, thus avoiding the unnecessary obscuring of aspects of embodiments.

It should be further understood that, when used in the specification, terms "comprising" and/or "containing" specify the presence of stated features, entireties, steps, operations, elements and/or components, but do not exclude the presence or addition of one or more other features, entireties, steps, operations, elements, components and/or groups thereof.

Terms used herein in the description of the present disclosure are only for the purpose of describing specific embodiments, but should not be construed to limit the present disclosure. As used in the description of the present disclosure and the appended claims, "a" and "the" in singular forms mean including plural forms, unless clearly indicated in the context otherwise.

It should also be understood that, as used herein, the term "and/or" represents and contains any one and all possible combinations of one or more associated listed items.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

In order to explain the technical solution of the present disclosure, specific embodiments are described below.

Figure 1:
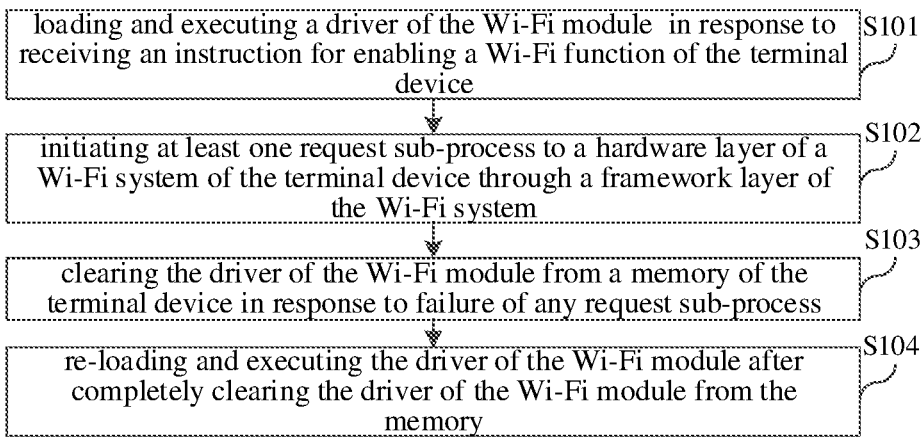
FIG. 1 is a flowchart illustrating a method for processing an abnormality according to an embodiment of the present disclosure.

FIG. 1 is a flowchart illustrating a method for processing an abnormality according to an embodiment of the present disclosure. The method is applicable in a terminal device including a Wi-Fi module. As illustrated in FIG. 1, the method may include the following.

At block S101, in response to receiving an instruction for enabling a Wi-Fi function of the terminal device, a driver of the Wi-Fi module is loaded and executed.

In the embodiment of the present disclosure, a user may click a display interface on the terminal device to enable the Wi-Fi function of the terminal device. For example, the terminal device such as a mobile phone may be provided with a virtual button for the Wi-Fi function, and after the user clicks the virtual button, the instruction for enabling the Wi-Fi function of the terminal device is sent via the virtual button.

After the instruction for enabling the Wi-Fi function of the terminal device is received, the driver of the Wi-Fi module is loaded into the memory and executed.

As an embodiment of the present disclosure, a daemon process may be set for the driver of the Wi-Fi module. The daemon process is started up in response to monitoring that the driver of the Wi-Fi module is executed. Other functions of the daemon process will be described hereinafter.

At block S102, at least one request sub-process is initiated to a hardware layer of a Wi-Fi system of the terminal device through a framework layer of the Wi-Fi system.

In the embodiment of the present disclosure, when the terminal device accesses the wireless local network to launch an internet business via the Wi-Fi module, the following processes are required, briefly including: enabling, scanning, displaying the scanned wireless access point, configuring the wireless access point, connecting to the wireless access point, acquiring an IP address, and accessing the network.

The framework layer of the Wi-Fi system needs to initiate a scanning request to the hardware layer of the Wi-Fi system during the scanning and the framework layer of the Wi-Fi system needs to initiate a connecting request to the hardware layer of the Wi-Fi system during the connecting, the process starting from initiating the scanning request to initiating the connecting request may be called to a scanning request sub-process, and the process starting from initiating the connecting request to connecting to the wireless access point may be called to a connecting request sub-process in the embodiment of the present disclosure. The request sub-process may include the scanning request sub-process and the connecting request sub-process. After the scanning request sub-process is performed successfully, the connecting request process is performed.

At block S103, in response to failure of any request sub-process, the driver of the Wi-Fi module is cleared from a memory of the terminal device.

In the embodiment of the present disclosure, when either the scanning request sub-process or the connecting request sub-process fails, it is needed to clear the driver of the Wi-Fi module from the memory.

Taking the scanning request sub-process as an example, if no scanning response is received from the hardware layer within a first preset duration after the framework layer initiates the scanning request to the hardware layer, it may be determined that the current scanning request sub-process fails, and the driver of the Wi-Fi module is cleared from the memory.

In an actual application, the situation that no scanning response is received from the hardware layer in a single scanning request sub-process may not be caused by a failure to load the driver into the memory, but may be caused by other reasons. It can be configured as follows, if no scanning response is received from the hardware layer within the first preset duration after the framework layer initiates the scanning request to the hardware layer, the framework layer continues to initiate the scanning request to the hardware layer, and it is determined that the current scanning request sub-process fails after the number of occurrences of initiating the scanning request continuously is greater than a certain number, and the driver of the Wi-Fi module is cleared from the memory. The scanning response is information indicating that the scanning request is received that is returned by the hardware layer of the Wi-Fi system to the framework layer.

At block S104, after completely clearing the driver of the Wi-Fi module from the memory, the driver of the Wi-Fi module is re-loaded and executed.

In the embodiment of the present disclosure, after the completion of clearing the driver of the Wi-Fi module from the memory, it is needed to re-load and execute the driver of the Wi-Fi module. In this way, the failure occurring in the previous loading and executing of the driver can be eliminated by re-loading and executing the driver of the Wi-Fi module.

As described above, the daemon process may be set for the driver of the Wi-Fi module. The daemon process may automatically start up the driver again in response to detecting an abnormal quit of the driver. In the embodiment of the present disclosure, since the clearing of the driver from the memory due to the failure of the request sub-process can be regarded as the processing for the abnormal quit of the driver, the daemon process may trigger re-loading and executing the driver of the Wi-Fi module in response to monitoring the completion of clearing the driver of the Wi-Fi module from the memory.

In an actual application, if the Wi-Fi module has an abnormality, the scanning request, the connecting request for a long time may result to unavailability of the Wi-Fi function, which may affect the user experience or even cause rebooting of the terminal device in serious condition.

According to the embodiment of the present disclosure, restoration of the Wi-Fi function is actively performed after determining an abnormality of the Wi-Fi function, for example, by clearing the driver from the memory and re-loading and executing the driver, such that the failure occurring in the previous loading and executing of the driver can be eliminated.

Figure 2:
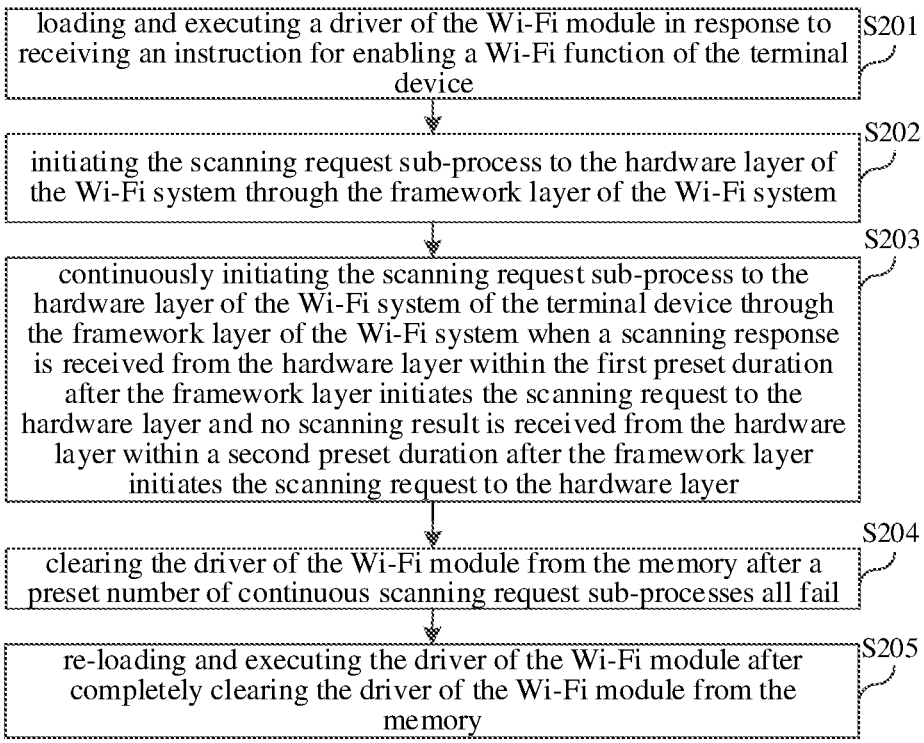
FIG. 2 is a flowchart illustrating a method for processing an abnormality according to another embodiment of the present disclosure.

FIG. 2 is a flowchart illustrating a method for processing an abnormality according to another embodiment of the present disclosure. The method is applicable in a terminal device including a Wi-Fi module, as illustrated in FIG. 2, the method may include the following.

At block S201, in response to receiving an instruction for enabling a Wi-Fi function of the terminal device, a driver of the Wi-Fi module is loaded and executed.

At block S202, a scanning request sub-process is initiated to a hardware layer of a Wi-Fi system of the terminal device through a framework layer of the Wi-Fi system.

The steps at blocks S201-S202 are consistent with the steps at blocks S101-S102, and reference can be made to the description of blocks S101-S102, which are not repeated here.

At block S203, if a scanning response returned from the hardware layer is received within a first preset duration after the framework layer initiates a scanning request to the hardware layer and no scanning result is received from the hardware layer within a second preset duration after the framework layer initiates the scanning request to the hardware layer, the scanning request sub-process is continuously initiated to the hardware layer of the Wi-Fi system of the terminal device through the framework layer of the Wi-Fi system.

At block S204, after a preset number of continuous scanning request sub-processes all fail, the driver of the Wi-Fi module is cleared from the memory.

In the embodiment of the present disclosure, a purpose of the scanning request sub-process is to obtain a list of scanned wireless access points. As described in the embodiment with reference to FIG. 1, if no scanning response is received from the hardware layer, it may indicate that the hardware layer may not receive the scanning request sent by the framework layer and the hardware layer may not perform scanning, or it may indicate that the framework layer and the hardware layer cannot communicate with each other normally due to an error in the communication between the framework layer and the hardware layer, and thus even though the hardware layer scans the wireless access point, it cannot return the scanning result to the framework layer. Therefore, if the framework layer does not receive the scanning response returned from the hardware layer within the first preset duration after initiating the scanning request to the hardware layer, it indicates that the scanning request sub-process fails. Even though the framework layer receives the scanning response returned from the hardware layer within the first preset duration after initiating the scanning request to the hardware layer, if the framework layer does not receive the scanning result returned from the hardware layer within the second preset duration after initiating the scanning request to the hardware layer, it indicates that the current scanning request sub-process fails. Only when the list of scanned wireless access points (i.e., the scanning result) is acquired, it indicates that the scanning request sub-process succeeds.

In an actual application, no matter not receiving the scanning response or not receiving the scanning result, it may be caused by an accidental abnormality, and it not means that there is an abnormality in the loading and executing of the driver in the memory of the terminal device. Thus, when the scanning response returned from the hardware layer is received within the first preset duration after the framework layer initiates the scanning request to the hardware layer and no scanning result is received from the hardware layer within the second preset duration after the framework layer initiates the scanning request to the hardware layer, the scanning request sub-process is continuously initiated to the hardware layer of the Wi-Fi system of the terminal device through the framework layer of the Wi-Fi system until a preset number of scanning request sub-processes all fail, and the driver of the Wi-Fi module is cleared from the memory.

It should be noted that, when the scanning request sub-process is initiated again, a preset number of scanning request sub-processes may be initiated continuously until the preset number of scanning request sub-processes all fail. In response to success of any scanning request sub-process, the connecting request sub-process can be performed.

As another embodiment of the present disclosure, if the scanning response returned from the hardware layer is received within the first preset duration after the framework layer initiates the scanning request to the hardware layer and no scanning result is received from the hardware layer within a third preset duration after the scanning response is received, it is determined that the current scanning request sub-process fails, and the driver of the Wi-Fi module is cleared from the memory.

In the embodiment of the present disclosure, the second preset duration may be set, which starts from the time when the framework layer initiates the scanning request to the hardware layer, or the third preset duration may be set, which starts from the time when the scanning response is received.

At block S205, after completely clearing the driver of the Wi-Fi module from the memory, the driver of the Wi-Fi module is re-loaded and executed.

The step at block S205 is consistent with the step at block S104, and reference can be made to the description of block S104, which are not repeated here.

Figure 3:
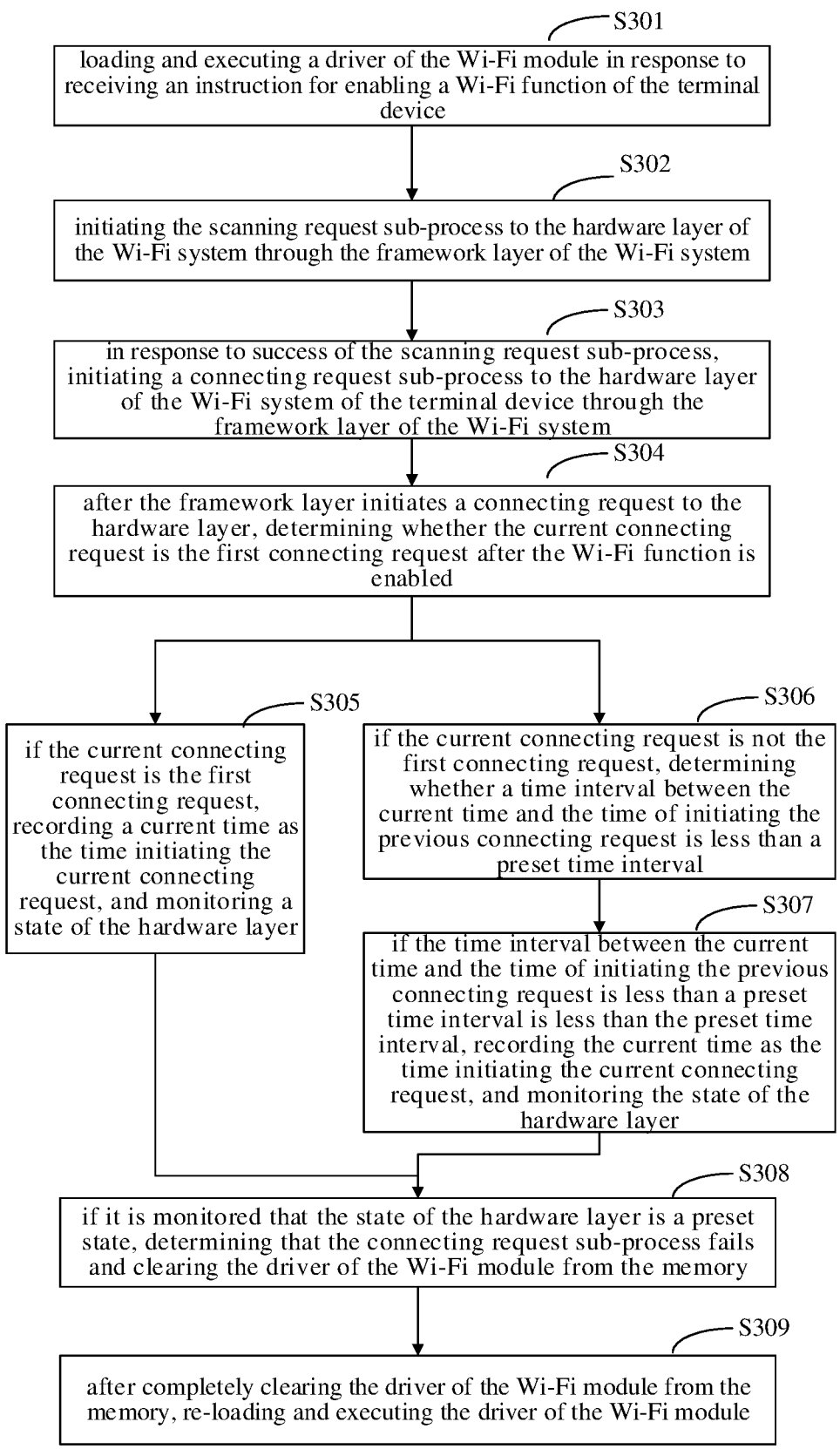
FIG. 3 is a flowchart illustrating a method for processing an abnormality according to a still another embodiment of the present disclosure.

FIG. 3 is a flowchart illustrating a method for processing an abnormality according to a still another embodiment of the present disclosure. The method is applicable in a terminal device including a Wi-Fi module, as illustrated in FIG. 3, the method may include the following.

At block S301, in response to receiving an instruction for enabling a Wi-Fi function of the terminal device, a driver of the Wi-Fi module is loaded and executed.

At block S302, a scanning request sub-process is initiated to a hardware layer of a Wi-Fi system of the terminal device through a framework layer of the Wi-Fi system.

At block S303, in response to success of the scanning request sub-process, a connecting request sub-process is initiated to the hardware layer of the Wi-Fi system of the terminal device through the framework layer of the Wi-Fi system.

At block S304, after the framework layer initiates a connecting request to the hardware layer, it is determined whether the current connecting request is the first connecting request after the Wi-Fi function is enabled.

At block S305, if the current connecting request is the first connecting request, a current time is recorded as the time initiating the current connecting request, and a state of the hardware layer is monitored.

At block S306, if the current connecting request is not the first connecting request, it is determined whether a time interval between the current time and the time of initiating the previous connecting request is less than a preset time interval.

At block S307, if the time interval between the current time and the time of initiating the previous connecting request is less than a preset time interval is less than the preset time interval, the current time is recorded as the time initiating the current connecting request, and the state of the hardware layer is monitored.

At block S308, if it is monitored that the state of the hardware layer is a preset state, it is determined that the connecting request sub-process fails and the driver of the Wi-Fi module is cleared from the memory.

At block S309, after completely clearing the driver of the Wi-Fi module from the memory, the driver of the Wi-Fi module is re-loaded and executed.

In the embodiment of the present disclosure, in response to success of the scanning request sub-process, the connecting request sub-process is performed. During performing the connecting request sub-process, the driver of the Wi-Fi module can be cleared from the memory after one connecting request sub-process fails, and after the completion of clearing the driver of the Wi-Fi module from the memory, the driver of the Wi-Fi module is re-loaded and executed, i.e., the scanning request sub-process and the connecting request sub-process are performed again. In order to avoid the failure of the first connecting request sub-process due to an abnormality in a single connecting process, after the first connecting request sub-process fails, the connecting request sub-process is performed again. If several connecting request sub-processes all fail, the driver of the Wi-Fi module may be cleared from the memory. After the completion of clearing the driver of the Wi-Fi module from the memory, the driver of the Wi-Fi module is re-loaded and executed. The scanning request sub-process and the connecting request sub-process are performed in sequence again.

In the embodiment of the present disclosure, the above steps at blocks S304-S309 can be descried as follows. Once the connecting request is sent, if it is monitored that the state of the hardware layer is the preset state, it is determined that the connecting request sub-process fails, and the driver of the Wi-Fi module is cleared from the memory. In other words, no matter how many times the connecting request sub-process is performed, as long as it is monitored that the state of the hardware layer is the preset state, the driver of the Wi-Fi module is cleared from the memory, and the driver of the Wi-Fi module is re-loaded and executed.

Based on the description of blocks S304-S309, the scanning request sub-process and the connecting request sub-process may be performed circularly all the time. Therefore, a terminate condition may be set. In any connecting request sub-process, after the framework layer initiates the connecting request to the hardware layer, it is determined whether the time interval between the current time and the time initiating the previous connecting request is less than the preset time interval. If the time interval between the current time and the time initiating the previous connecting request is greater than or equal to the preset time interval, it indicates that there is an abnormality in the hardware layer, such that it is unnecessary to perform the clearing, the loading and executing of the driver, and the Wi-Fi function of the terminal device can be disabled.

In an actual application, other terminate conditions can be set. If the Wi-Fi module cannot connect to the wireless access point successfully within a fourth preset duration after the instructions for enabling the Wi-Fi function of the terminal device is received, the Wi-Fi function of the terminal device is disabled.

As another embodiment of the present disclosure, the state of the hardware layer may be monitored as follows. If the state of the hardware layer is in switching, a switching result is waited. If the switching of the state of the hardware layer is completed, the switching result is monitored as the state of the hardware layer.

In the embodiment of the present disclosure, the framework layer and the hardware layer (underlying chip or supplicant) need to keep in the same state to handle a message together. The state of the hardware layer may be a connected state or a blank state. The connected state indicates that it is connected to the wireless access point. The blank state indicates that it is not connected to the wireless access point. The state of the hardware layer may be in switching. It the state of the hardware layer is in switching, the current message is pending, and it not means that there is an abnormality, the switching result is waited. The preset state is the blank state.

As another embodiment of the present disclosure, before the driver of the Wi-Fi module is cleared from the memory, the method further includes opening a virtual running environment, executing the driver of the Wi-Fi module loaded currently in the virtual running environment, and clearing the driver of the Wi-Fi module from the memory if the driver of the Wi-Fi module is failed to execute in the virtual running environment.

In the embodiment, before the driver of the Wi-Fi module is cleared from the memory, it may be determined whether the currently loaded driver has an abnormality. If the currently loaded driver has an abnormality, the driver is re-loaded and executed. If the currently loaded driver does not have an abnormality, it is meaningless to clear the driver from the memory and re-load and execute the driver. Therefore, the virtual running environment can be opened, and the currently loaded driver of the Wi-Fi module can be executed in the virtual running environment. If the driver of the Wi-Fi module is failed to execute in the virtual running environment, it indicates that there is an abnormality in the currently loaded driver of the Wi-Fi module, the driver of the Wi-Fi module is cleared from the memory.

As another embodiment of the present disclosure, if the driver of the Wi-Fi module is successfully executed in the virtual running environment, the driver of the Wi-Fi module is re-executed, and at least one request sub-process is again initiated to the hardware layer of the Wi-Fi system through the framework layer of the Wi-Fi system of the terminal device.

If the driver of the Wi-Fi module is successfully executed in the virtual running environment, it indicates that there is no abnormality in the currently loaded driver of the Wi-Fi module, the failure may be caused by other reasons, such that it is unnecessary to perform the clearing, the re-loading and executing of the driver, but the driver of the Wi-Fi module is re-executed and the at least one request sub-process is initiated again to the hardware layer of the Wi-Fi system through the framework layer of the Wi-Fi system of the terminal device.

Before the virtual running environment is opened, the method further includes presetting the virtual running environment, which includes setting a virtual Wi-Fi module in the virtual running environment based on a hardware parameter of the Wi-Fi module, and setting a response message for the virtual Wi-Fi module based on data interaction between the framework layer and the hardware layer.

As another embodiment of the present disclosure, after the at least one request sub-process is initiated to the hardware layer of the Wi-Fi system through the framework layer of the Wi-Fi system of the terminal device, the method further includes if all of the at least one request sub-process succeed, accessing the network through a wireless access point for which a connection is requested in the connecting request sub-process.

In the embodiment, if all the request sub-processes succeed, it indicates that the scanning request sub-process and the connecting request sub-process succeed, which means that one wireless access point is connected, and the network can be accessed through the wireless access point for which the connection is requested in the connecting request sub-process.

It should be understood that, the order numbers of the steps in the above embodiments does not mean the order of the steps. The order of each step may be determined based on its function and internal logic, which should not constitute a limitation on the implementation of the embodiment.

Figure 4:
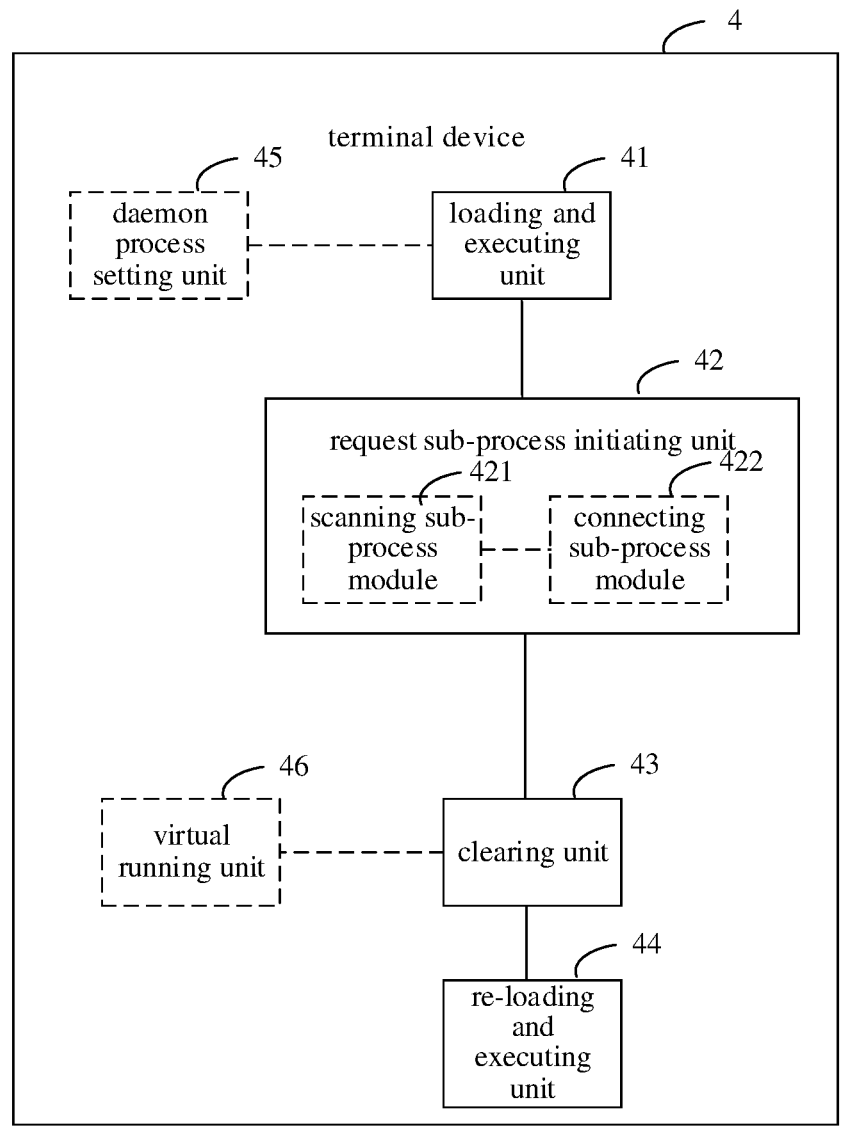
FIG. 4 is a block diagram illustrating a terminal device according to an embodiment of the present disclosure.

FIG. 4 is a block diagram illustrating a terminal device according to an embodiment of the present disclosure. For ease of description, merely parts related to the present disclosure are shown.

The terminal device 4 may be a software unit, a hardware unit or a combination thereof built in a terminal apparatus such as a mobile phone, a tablet computer, a notebook computer, or may be an accessory integrated into the terminal apparatus such as a mobile phone, a tablet computer, a notebook computer.

The terminal device 4 includes a loading and executing unit 41, a request sub-process initiating unit 42, a clearing unit 43 and a re-loading and executing unit 44.

The loading and executing unit 41 is configured to load and execute a driver of the Wi-Fi module in response to receiving an instruction for enabling a Wi-Fi function of the terminal device.

The request sub-process initiating unit 42 is configured to initiate at least one request sub-process to a hardware layer of a Wi-Fi system of the terminal device through a framework layer of the Wi-Fi system.

The clearing unit 43 is configured to clear the driver of the Wi-Fi module from a memory of the terminal device in response to failure of any request sub-process.

The re-loading and executing unit 44 is configured to re-load and execute the driver after completely clearing the driver of the Wi-Fi module from the memory.

As another embodiment of the present disclosure, the request sub-process includes a scanning request sub-process and a connecting request sub-process.

As another embodiment of the present disclosure, the request sub-process initiating unit 42 includes a scanning sub-process module 421 and a connecting sub-process module 422.

The scanning sub-process module 421 is configured to initiate the scanning request sub-process to hardware layer of the Wi-Fi system of the terminal device through the framework layer of the Wi-Fi system.

The connecting sub-process module 422 is configured to initiate the connecting request sub-process to the hardware layer of the Wi-Fi system of the terminal device through the framework layer of the Wi-Fi system in response to success of the scanning request sub-process.

As another embodiment of the present disclosure, when initiating the scanning request sub-process to the hardware layer of the Wi-Fi system of the terminal device through the framework layer of the Wi-Fi system, the clearing unit 43 is further configured to determine that the scanning request sub-process fails and clear the driver of the Wi-Fi module from the memory in response to not receiving any scanning response from the hardware layer within a first preset duration after the framework layer initiates a scanning request to the hardware layer.

As another embodiment of the present disclosure, when initiating the scanning request sub-process to the hardware layer of the Wi-Fi system of the terminal device through the framework layer of the Wi-Fi system, the clearing unit 43 is further configured to determine that the scanning request sub-process fails and clear the driver of the Wi-Fi module from the memory in response to receiving a scanning response from the hardware layer within a first preset duration after the framework layer initiates a scanning request to the hardware layer and no scanning result is received from the hardware layer within a second preset duration after the framework layer initiates the scanning request to the hardware layer.

As another embodiment of the present disclosure, when initiating the scanning request sub-process to the hardware layer of the Wi-Fi system of the terminal device through the framework layer of the Wi-Fi system, the clearing unit 43 is further configured to determine that the scanning request sub-process fails and clear the driver of the Wi-Fi module from the memory in response to receiving a scanning response from the hardware layer within a first preset duration after the framework layer initiates a scanning request to the hardware layer and no scanning result is received from the hardware layer within a third preset duration after the scanning response is received.

As another embodiment of the present disclosure, the scanning sub-process module 421 is further configured to continuously initiate the scanning request sub-process to the hardware layer of the Wi-Fi system of the terminal device through the framework layer of the Wi-Fi system before the driver of the Wi-Fi module is cleared from the memory, until a preset number of continuous scanning request sub-processes all fail.

As another embodiment of the present disclosure, when initiating the connecting request sub-process to the hardware layer of the Wi-Fi system of the terminal device through the framework layer of the Wi-Fi system, the clearing unit 43 is further configured to determine whether a present connecting request is the first connecting request after the framework layer initiates the present connecting request to the hardware layer, record a current time as the time of initiating the present connecting request and monitor a state of the hardware layer when the present connecting request is the first connecting request, determine that the connecting request sub-process fails and clear the driver of the Wi-Fi module from the memory in response to monitoring that the state of the hardware layer is a preset state.

As another embodiment of the present disclosure, when initiating the connecting request sub-process to the hardware layer of the Wi-Fi system of the terminal device through the framework layer of the Wi-Fi system, the clearing unit 43 is further configured to determine whether a time interval between the current time and a time of initiating a previous connecting request is less than a preset time interval when the present connecting request is not the first connecting request, record the current time as the time of initiating the present connecting request and monitor the state of the hardware layer when the time interval between the current time and the time of initiating the previous connecting request is less than the preset time interval, determine that the connecting request sub-process fails and clear the driver of the Wi-Fi module from the memory in response to monitoring that the state of the hardware layer is the preset state.

As another embodiment of the present disclosure, the clearing unit 43 is further configured to wait for a switching result when the state of the hardware layer is in switching, and determine the switching result as the state of the hardware layer in response to completing the switching of the state of the hardware layer.

As another embodiment of the present disclosure, the terminal device 4 further includes a daemon process setting unit 45 configured to set a daemon process for the driver of the Wi-Fi module. The daemon process is started up in response to monitoring that the driver of the Wi-Fi module is executed. The daemon process triggers re-loading and executing the driver of the Wi-Fi module in response to monitoring that the driver of the Wi-Fi module is cleared completely from the memory.

As another embodiment of the present disclosure, the re-loading and executing unit 44 is further configured to trigger by the daemon process re-loading and executing the driver of the Wi-Fi module in response to monitoring that the driver of the Wi-Fi module is cleared completely from the memory.

As another embodiment of the present disclosure, the terminal device 4 further includes a virtual running unit 46, configured to open a virtual running environment before the driver of the Wi-Fi module is cleared from the memory, execute the driver of the Wi-Fi module loaded currently in the virtual running environment.

The clearing unit 43 is configured to clear the driver of the Wi-Fi module from the memory in response to failure of the driver of the Wi-Fi module to execute in the virtual running environment.

As another embodiment of the present disclosure, the re-loading and executing unit 44 is further configured to re-execute the driver of the Wi-Fi module in response to the driver of the Wi-Fi module succeeding in executing in the virtual running environment after executing the driver of the Wi-Fi module loaded currently in the virtual running environment, and initiate at least one request sub-process to the hardware layer of the Wi-Fi system through the framework layer of the Wi-Fi system of the terminal device.

As another embodiment of the present disclosure, the terminal device 4 further includes a virtual environment setting unit, configured to set a virtual Wi-Fi module in the virtual running environment based on a hardware parameter of the Wi-Fi module, and set a response message for the virtual Wi-Fi module based on data interaction between the framework layer and the hardware layer.

As another embodiment of the present disclosure, the terminal device 4 further includes a Wi-Fi disabling unit, configured to disable the Wi-Fi function in response to failure of the Wi-Fi module to connect to a wireless access point within a fourth preset duration after the instructions for enabling the Wi-Fi function of the terminal device is received.

As another embodiment of the present disclosure, the terminal device 4 further includes an network accessing unit, configured to access a network through a wireless access point for which a connection is requested in the connecting request sub-process in response to successes of all of the at least one request sub-process.

Those skilled in the art can understand clearly that, for clarity and conciseness of description, the division of functional units and modules described above is only for illustration. In an actual application, the above functions may be implemented by different functional units and modules according to requirements, i.e., the internal structure of the terminal device may be divided into different functional units and modules, so as to complete all or part of functions described above. Respective functional units and modules in respective embodiments of the present disclosure can be integrated into one processing unit, or can be present as separate physical entities. It is also possible that two or more than two units are integrated into one unit. The integrated units may be implemented in form of hardware, or in form of functional software units. In addition, the designations of the respective functional units and modules are merely used for distinguishing one from another and are not intended to limit the present disclosure. Regarding the specific working processes of the functional units and modules in the above terminal device, reference can be made to the corresponding processes in the above method embodiments, which are not repeated here.

Figure 5:
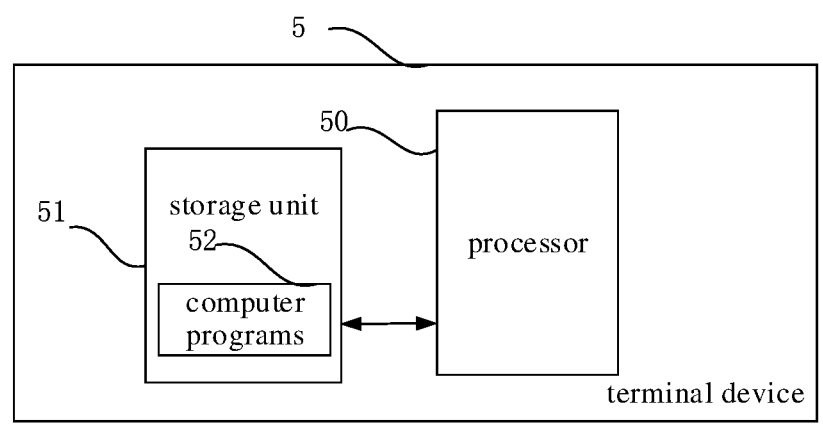
FIG. 5 is a block diagram illustrating a terminal device according to another embodiment of the present disclosure.

FIG. 5 is a block diagram illustrating a terminal device according to another embodiment of the present disclosure. As illustrated in FIG. 5, the terminal device 5 in the embodiment includes one or more processors 50, a storage unit 51 and computer programs 52 stored in the storage unit 51 and executable on the processor 50. The processor 50 executes the computer programs 52 to implement steps in the above method embodiments, for example steps at blocks S101-S104 illustrated in FIG. 1. Or, the processor 50 executes the computer programs 52 to implement functions of respective modules/units in the above device embodiments, for example functions of modules 41-44 illustrated in FIG. 4.

For example, the computer programs 52 may be divided in to one or more modules/units, which are stored in the storage unit 51 and executed by the processor 50 to implement the present disclosure. The one or more modules/units may be a series of computer program instruction segments capable of finish specific functions, the instruction segments are used to describe the execution process of the computer programs 52 in the terminal device 5. For example, the computer programs 52 may be divided into the loading and executing unit, the request sub-process initiating unit, the clearing unit and the re-loading and executing unit.

For example, the loading and executing unit is configured to load and execute a driver of the Wi-Fi module after an instruction for enabling a Wi-Fi function of the terminal device is received.

The request sub-process initiating unit is configured to initiate at least one request sub-process to a hardware layer of a Wi-Fi system of the terminal device through a framework layer of the Wi-Fi system.

The clearing unit is configured to clear the driver of the Wi-Fi module from a memory of the terminal device if any request sub-process fails.

The re-loading and executing unit is configured to re-load and execute the driver after completely clearing the driver of the Wi-Fi module from the memory.

Regarding other units or modules, reference can be made to the description of the embodiment of FIG. 4, which is not repeated here.

The terminal device includes, but is not limited to the processor 50 and the storage unit 51. Those skilled in the art may understand that, the structure illustrated in FIG. 5 is merely an example of the terminal device 5 and does not constitute a limitation on the terminal device 5. The terminal device may include less or more components than those illustrated in FIG. 5 or combinations thereof, or have a different arrangement of components. For example, the terminal device may further include an input device, an output device, a network accessing device, a bus, a touch screen display and so on.

The processor 50 may be a central processing unit (CPU), or a general-purpose processor, a digital signal processor (DP), an application specific integrated circuit (ASIC), a field-programmable gate array (FPGA) or other programmable logic devices, discrete component gates or transistor logic devices, discrete hardware components or the like. The general-purpose processor may be a micro-processor, or other normal processor.

The storage unit 51 may be an internal storage of the terminal device 5, for example, hard disk or memory. The storage unit 51 may also be an external storage of the terminal device 5, for example, a plug-in-type hard disk, a smart media card (SMC), a secure digital (SD) card, a flash card or the like provided for the terminal device 5. Further, the storage unit 51 may further include both the internal storage and the external storage of the terminal device 5. The storage unit 51 is configured to store the computer programs and other programs and data required by the terminal device. The storage unit 51 may be further configured to temporarily store outputted data or data to be outputted.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It should be understood that, the terminal device and the method disclosed in several embodiments provided by the present disclosure can be realized in any other manner. For example, the terminal device embodiments described above can be merely exemplary, for example, the units are just divided according to logic functions. In practical implementation, the units can be divided in other manners, for example, multiple units or components can be combined or integrated into another system, or some features can be omitted or not executed. In addition, the mutual coupling or direct coupling or communication connection described or discussed can be via some interfaces, and indirect coupling or communication connection between devices or units may be electrical, mechanical or of other forms.

The units illustrated as separate components can be or not be separated physically, and components described as units can be or not be physical units, i.e., can be located at one place, or can be distributed onto multiple network units. It is possible to select some or all of the units according to actual needs, for realizing the objective of embodiments of the present disclosure.

In addition, respective functional units in respective embodiments of the present disclosure can be integrated into one processing unit, or can be present as separate physical entities. It is also possible that two or more than two units are integrated into one unit. The integrated units may be implemented in form of hardware, or in form of functional software units.

If the integrated module/unit is implemented in form of functional software units and are sold or used as separate products, it can be stored in a computer readable storage medium. Based on this understanding, all or parts of the above method embodiments of the present disclosure can be embodied by instructing related hardware using the computer programs, which may be stored in a computer readable storage medium. When the computer programs are executed by a processor, the steps of the above method embodiments can be implemented. The computer programs may include computer program codes, which may be in the form of source codes, object codes, executable documents or some intermediate documents. The computer readable medium may include any entity or device capable of carrying the computer program codes, record medium, USB flash disk, a mobile hard disk, a disc, an optical disk, a Read-Only Memory (ROM), a Random Access Memory (RAM), an electric carrier signal, a telecommunication signal and software distribution medium. It should be noted that, the content contained in the computer readable storage medium may be supplemented or pruned according to the patent law and practice requirements in the jurisdictions, for example, in some jurisdictions, according to the patent law and practices, the computer readable storage medium does not include the electric carrier signal and the telecommunication signal.

In above embodiments, each embodiment may be described with focusing on different aspects. Parts not be described in some embodiments may refer to relative descriptions in other embodiments.

The forgoing description is only directed to preferred embodiments of the present disclosure, but not used to limit the present disclosure. It will be appreciated that, various modifications and changes can be made to the technical solutions in the above embodiments or some technical features may be replaced with substitutions. All modifications, equivalents, variants and improvements made within the spirit and principle of the present disclosure shall fall within the protection scope of the present disclosure.

What is claimed is:

1. A method for processing an abnormality, applicable in a terminal device comprising a Wi-Fi module, the method comprising:
   loading and executing a driver of the Wi-Fi module in response to receiving an instruction for enabling a Wi-Fi function of the terminal device,
   initiating at least one request sub-process to a hardware layer of a Wi-Fi system of the terminal device through a framework layer of the Wi-Fi system;
   clearing the driver of the Wi-Fi module from a memory of the terminal device in response to failure of any request sub-process; and
   re-loading and executing the driver of the Wi-Fi module after completely clearing the driver of the Wi-Fi module from the memory.

2. The method of claim 1, wherein, the request sub-process comprises:
   a scanning request sub-process and a connecting request sub-process.

3. The method of claim 2, wherein initiating the at least one request sub-process to the hardware layer of the Wi-Fi system of the terminal device through the framework layer of the Wi-Fi system comprises:
   initiating the scanning request sub-process to the hardware layer of the Wi-Fi system through the framework layer of the Wi-Fi system; and initiating the connecting request sub-process to the hardware layer of the Wi-Fi system through the framework layer of the Wi-Fi system in response to success of the scanning request sub-process.

4. The method of claim 2, wherein clearing the driver of the Wi-Fi module from the memory of the terminal device in response to failure of any request sub-process comprises:
determining that the scanning request sub-process fails and clearing the driver of the Wi-Fi module from the memory in response to not receiving any scanning response from the hardware layer within a first preset duration after the framework layer initiates a scanning request to the hardware layer.

5. The method of claim 4, wherein clearing the driver of the Wi-Fi module from the memory of the terminal device in response to failure of any request sub-process comprises:
determining that the scanning request sub-process fails and clearing the driver of the Wi-Fi module from the memory in response to receiving a scanning response from the hardware layer within the first preset duration after the framework layer initiates the scanning request to the hardware layer and no scanning result is received from the hardware layer within a second preset duration after the framework layer initiates the scanning request to the hardware layer.

6. The method of claim 4, wherein clearing the driver of the Wi-Fi module from the memory of the terminal device in response to failure of any request sub-process comprises:
determining that the scanning request sub-process fails and clearing the driver of the Wi-Fi module from the memory in response to receiving a scanning response from the hardware layer within the first preset duration after the framework layer initiates the scanning request to the hardware layer and no scanning result is received from the hardware layer within a third preset duration after the scanning response is received.

7. The method of claim 5, further comprising:
continuously initiating the scanning request sub-process to the hardware layer of the Wi-Fi system of the terminal device through the framework layer of the Wi-Fi system, until a preset number of continuous scanning request sub-processes all fail.

8. The method of claim 2, wherein clearing the driver of the Wi-Fi module from the memory of the terminal device in response to failure of any request sub-process comprises:
determining whether a present connecting request is the first connecting request after the framework layer initiates the present connecting request to the hardware layer;
recording a current time as the time of initiating the present connecting request and monitoring a state of the hardware layer when the present connecting request is the first connecting request; and
determining that the connecting request sub-process fails and clearing the driver of the Wi-Fi module from the memory in response to monitoring that the state of the hardware layer is a preset state.

9. The method of claim 8, wherein determining whether the present connecting request is the first connecting request comprises:
determining whether a time interval between the current time and a time of initiating a previous connecting request is less than a preset time interval when the present connecting request is not the first connecting request;
recording the current time as the time of initiating the present connecting request and monitoring the state of the hardware layer when the time interval between the current time and the time of initiating the previous connecting request is less than the preset time interval;
determining that the connecting request sub-process fails and clearing the driver of the Wi-Fi module from the memory in response to monitoring that the state of the hardware layer is the preset state.

10. The method of claim 9, wherein determining whether the time interval between the current time and the time of initiating a previous connecting request is less than a preset time interval when the present connecting request is not the first connecting request comprises:
disabling the Wi-Fi function when the time interval between the current time and the time of initiating the previous connecting request is greater than or equal to the preset time interval.

11. The method of claim 8, wherein monitoring the state of the hardware layer comprises:
waiting for a switching result when the state of the hardware layer is in switching; and
determining the switching result as the state of the hardware layer in response to completing the switching of the state of the hardware layer.

12. The method of claim 1, further comprising:
setting a daemon process for the driver of the Wi-Fi module; and
starting up the daemon process in response to monitoring that the driver of the Wi-Fi module is executed.

13. The method of claim 12, wherein re-loading and executing the driver of the Wi-Fi module after completely clearing the driver of the Wi-Fi module from the memory comprises:
triggering by the daemon process re-loading and executing the driver of the Wi-Fi module in response to monitoring that the driver of the Wi-Fi module is cleared completely from the memory.

14. The method of claim 1, further comprising:
opening a virtual running environment and executing the driver of the Wi-Fi module loaded currently in the virtual running environment; and
clearing the driver of the Wi-Fi module from the memory in response to failure of the driver to execute in the virtual running environment.

15. The method of claim 14, further comprising:
re-executing the driver of the Wi-Fi module in response to the driver succeeding in executing in the virtual running environment; and
initiating at least one request sub-process to the hardware layer of the Wi-Fi system through the framework layer of the Wi-Fi system of the terminal device.

16. The method of claim 14, further comprising setting the virtual running environment comprising:
setting a virtual Wi-Fi module in the virtual running environment based on a hardware parameter of the Wi-Fi module; and
setting a response message for the virtual Wi-Fi module based on data interaction between the framework layer and the hardware layer.

17. The method of claim 1, further comprising:
disabling the Wi-Fi function in response to failure of the Wi-Fi module to connect to a wireless access point within a fourth preset duration after the instructions for enabling the Wi-Fi function of the terminal device is received.

18. The method of claim 2, further comprising:
accessing a network through a wireless access point for which a connection is requested in the connecting request sub-process in response to successes of all of the at least one request sub-process.

19. A terminal device, comprising:
a processor; and
a memory configured to store computer programs executable on the processor;
wherein the processor is configured to perform the following when executing the computer programs:
loading and executing a driver of a Wi-Fi module in response to receiving an instruction for enabling a Wi-Fi function of the terminal device,
initiating at least one request sub-process to a hardware layer of a Wi-Fi system of the terminal device through a framework layer of the Wi-Fi system;
clearing the driver of the Wi-Fi module from a memory of the terminal device in response to failure of any request sub-process; and
re-loading and executing the driver of the Wi-Fi module after completely clearing the driver of the Wi-Fi module from the memory.

20. A non-transitory computer-readable storage medium, having computer programs stored therein, wherein when the computer programs are executed by one or more processors, the one or more processors are caused to perform the following:
loading and executing a driver of a Wi-Fi module in response to receiving an instruction for enabling a Wi-Fi function of a terminal device,
initiating at least one request sub-process to a hardware layer of a Wi-Fi system of the terminal device through a framework layer of the Wi-Fi system;
clearing the driver of the Wi-Fi module from a memory of the terminal device in response to failure of any request sub-process; and
re-loading and executing the driver of the Wi-Fi module after completely clearing the driver of the Wi-Fi module from the memory.

* * * * *